United States Patent
Oguchi

(10) Patent No.: US 8,457,065 B2
(45) Date of Patent: Jun. 4, 2013

(54) HANDOVER METHOD IN WIRELESS COMMUNICATION SYSTEM, MOBILE STATION, AND WIRELESS COMMUNICATION SYSTEM

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 696 days.

(21) Appl. No.: 12/354,015

(22) Filed: Jan. 15, 2009

(65) Prior Publication Data

US 2009/0190555 A1 Jul. 30, 2009

(30) Foreign Application Priority Data

Jan. 30, 2008 (JP) ................................ 2008-018508

(51) Int. Cl.
*H04W 4/00* (2009.01)

(52) U.S. Cl.
USPC ........................................................... 370/331

(58) Field of Classification Search
USPC ......... 370/203, 204–215, 229–240, 241–253, 370/310–337, 338–350, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| | | | |
|---|---|---|---|
| 6,370,377 B1 | 4/2002 | Take et al. | |
| 7,499,431 B2 * | 3/2009 | Wang et al. | 370/331 |
| 7,573,841 B2 * | 8/2009 | Lee et al. | 370/311 |
| 7,715,842 B2 * | 5/2010 | Kim et al. | 455/436 |
| 7,885,232 B2 * | 2/2011 | Park et al. | 370/331 |
| 7,890,107 B2 * | 2/2011 | Kim et al. | 455/436 |
| 7,894,346 B2 * | 2/2011 | Kim et al. | 370/235 |
| 7,920,525 B2 * | 4/2011 | Kim et al. | 370/332 |
| 7,953,412 B2 * | 5/2011 | Lee et al. | 455/436 |
| 2005/0090259 A1 * | 4/2005 | Jain et al. | 455/439 |
| 2005/0250498 A1 * | 11/2005 | Lim et al. | 455/436 |
| 2007/0054667 A1 * | 3/2007 | Lee et al. | 455/434 |

(Continued)

FOREIGN PATENT DOCUMENTS

| | | |
|---|---|---|
| JP | 11004470 | 1/1999 |
| JP | 2000-69541 | 3/2000 |

(Continued)

OTHER PUBLICATIONS

IEEE Std802.16e-2005 (Amendment and Corrigendum to IEEE Std802.16-2004), Air Interface for Fixed Broadband Wireless Access Systems, Amendment 2: Physical and Medium Access Control Layers for Combined Fixed and Mobile Operation in Licensed Bands, Feb. 28, 2006.

(Continued)

*Primary Examiner* — Jung-Jen Liu
(74) *Attorney, Agent, or Firm* — Myers Wolin, LLC

(57) ABSTRACT

A handover method, in a wireless communication system having a mobile station and a plurality of base stations, for performing handover of the mobile station from a connected base station to a neighbor base station, the method having the steps of: deciding that neighbor base station information non-reception handover is establish; searching a connectable neighbor base station; acquiring identification information for the neighbor base station; transmitting a handover request including the acquired identification information; transmitting, in the connected base station received the handover request, to the mobile station, service level information included with in a handover response, and deciding a handover destination based on the service level information.

8 Claims, 11 Drawing Sheets

WIRELESS COMMUNICATION SYSTEM 1

U.S. PATENT DOCUMENTS

| | | | |
|---|---|---|---|
| 2008/0132238 A1* | 6/2008 | Hsieh et al. | 455/437 |
| 2009/0141683 A1* | 6/2009 | Grinshpun et al. | 370/331 |
| 2009/0190553 A1 | 7/2009 | Masuda et al. | |
| 2009/0190555 A1* | 7/2009 | Oguchi | 370/331 |
| 2009/0296659 A1 | 12/2009 | Lim et al. | |
| 2010/0216474 A1* | 8/2010 | Park et al. | 455/436 |

FOREIGN PATENT DOCUMENTS

| | | |
|---|---|---|
| JP | 2002-027519 | 1/2002 |
| JP | 2003-289561 | 10/2003 |
| JP | 2005175932 | 6/2005 |
| JP | 2006311253 | 11/2006 |
| JP | 2007-536784 | 12/2007 |
| WO | 2007/142199 | 12/2007 |

OTHER PUBLICATIONS

Notification of Reason for Rejection issued for corresponding Japanese Patent Application No. 2008-018508 dispatched on May 8, 2012 with partial English translation.

* cited by examiner

WIRELESS COMMUNICATION SYSTEM 1

| VALUE | CONTENTS |
|---|---|
| 0 | No service possible for this MS |
| 1 | Some service is available for one or several service flows authorized for the MS. |
| 2 | For each authorized service flow, a MAC connection can be established with QoS specified by the AuthorizedQoSParamSet. |
| 3 | No service level prediction available. |

HANDOVER METHOD IN WIRELESS COMMUNICATION SYSTEM, MOBILE STATION, AND WIRELESS COMMUNICATION SYSTEM

CROSS-REFERENCE TO RELATED APPLICATIONS

This application is based upon and claims the benefit of priority of the prior Japanese Patent Application No. 2008-18508, filed on Jan. 30, 2008, the entire contents of which are incorporated herein by reference.

FIELD

The present invention relates to a handover method in a wireless communication system, a mobile station, and a wireless communication system.

BACKGROUND

The "WiMAX" communication standards for mobile stations primarily stipulate, as base station switching procedures (hereafter "handover"), two types, "Controlled HO" and "Uncontrolled HO" (see for example IEEE 802.16e-2005).

Controlled HO is a handover procedure such that, when a mobile station (MS: Mobile Station) moves, the base station (BS: Base Station) is switched after negotiation with the currently connected base station (BS).

That is, when a mobile station (MS) decides on a neighbor base station (NBS: Neighbor BS) as a handover destination, the mobile station (MS) receives periodically (for example, in 30 second intervals) neighbor BS information (MOB_NBR-ADV) from the currently connected base station (SBS: Serving BS), and measures the radio wave strength of the neighbor base station (NBS) based on identification information (BSID) of the neighbor base station (NBS) contained in the neighbor BS information. Then, based on the radio wave strength and service level (SLP: Service Level Prediction) of the neighbor base station (NBS), the mobile station (MS) finally decides the neighbor base station (NBS) to be the handover destination. The service level Prediction is information indicating whether service flow can be handed over, that is, whether the current service flow can be handed over to the destination base station (BS), and is a parameter obtained from the serving base station (SBS) in the HO-REQ/RSP sequence. FIG. 12 shows an example of service level prediction (SLP) information.

On the other hand, uncontrolled HO is an emergency recovery procedure for a case in which communication of a mobile station (MS) with the serving base station (SBS) is interrupted prior to completion of a controlled HO procedure; a connection is made to a base station (BS) with which connection is possible based on radio wave strength, without performing an HO sequence with the serving base station (SBS). In uncontrolled HO, the mobile station (MS) does not execute the HO-REQ/RSP sequence, and so service level information cannot be utilized.

For example, as shown in FIG. 11, a case is considered in which a mobile station (MS) 100 is handed over to a certain base station (BS#1) 200-1, and has left the communication range (cell) of this base station (BS#1) 200-1 in approximately 30 seconds.

FIG. 13 shows the sequence example for this operation. The base station (BS#1) 200-1 broadcasts neighbor BS information (MOB_NBR-ADV) (S101). However, the mobile station (MS) 100 is not connected to the base station (BS#1) 200-1, and so cannot receive the neighbor BS information.

Thereafter, the mobile station (MS) 100 moves to within the cell range of the base station (BS#1) 200-1, and executes the connection procedure (S102). The mobile station (MS) 100 attempts to perform handover when the radio wave strength of the base station (BS#1) 200-1 reduces, but is not receiving the connection BS information, and so has no identification information for a neighbor base station (NBS), and cannot execute the HO-REQ/REP sequence (S103). The mobile station (MS) 100 finds a neighbor base station (BS#2) 200-2 based on radio wave strength, and performs uncontrolled HO (S104, S106 to S109).

When the mobile station (MS) 100 receives information ("SLP=0") indicating that taking over service level is not possible from the target base station (BS#2) 200-2 (s109), the mobile station (MS) 100 executes a sequence to reregister (reset) a new service flow with the target base station (BS#2) (S110 to S112).

However, even if the uncontrolled HO procedure is executed, the target base station (BS#2) 200-2 cannot necessarily takes over the service flow of the serving base station (BS#1) 200-1. On the other hand, the mobile station (MS) 100 cannot confirm whether service flow can be taken over until after handover (S106 to S109). Upon obtaining the information that the service flow cannot be taken over (SLP=0), the mobile station (MS) 100 performs re-registration of the service flow (S110 to S112), so that much time is required for handover.

Even when the mobile station (MS) 100 uses the controlled HO procedure executing the HO-REQ/RES sequence with the serving base station (BS#1) 200-1 (S103), and receives service level information, it performs service flow re-registration, if taking over service level at the target base station (BS#2) is not possible (SLP=0).

In this way, in the case of uncontrolled HO or in the case that service flow is not taken over under controlled HO, the mobile station (MS) 100 performs service flow re-registration if service flow cannot be handed over between the handover destination base station (BS#2) and the serving base station (BS#1). As a result, there is the problem that time is required for handover.

SUMMARY

With the foregoing in view, it is an object of the present invention to provide a handover method in a wireless communication system, mobile station, and wireless communication system, which shorten the handover time.

To achieve the object, one aspect of the present invention is a handover method, in a wireless communication system having a mobile station and a plurality of base stations, for performing handover of the mobile station from a connected base station to a neighbor base station, the method having the steps of: deciding that neighbor base station information non-reception handover is establish, in the mobile station, if the mobile station is without receiving neighbor base station information relating to the neighbor base stations from the connected base station and radio wave strength of radio waves from the connected base station is below a threshold value; searching a connectable neighbor base station based on frequencies stored in a table in the mobile station, if, in the decision step, a decision is made that the neighbor base station information non-reception handover is established; acquiring, in the mobile station, identification information for the neighbor base station from the connectable neighbor base station; transmitting, in the mobile station, a handover request including the acquired identification information to the connected base station; transmitting, in the connected base station received the handover request, to the mobile station, service level information included with in a handover response, the service level information indicating information as to what extent of service flow can be handed over from the connected base station to the neighbor base station; and acquiring, in the mobile station, the service level information from the handover response, and deciding a handover destination based on the service level information.

Further, to achieve the object, another aspect of the present invention is a mobile station, for performing handover from a serving base station to a neighbor base station, having: a neighbor base station information non-reception handover decision unit which decides that neighbor base station information non-reception handover is established, if neighbor base station information relating to the neighbor base stations is not received from the serving base station and the radio wave strength of radio waves from the serving base station is lower than a threshold value; a scan processing unit which searches for the connectable neighbor base station based on frequencies stored in a table, if the neighbor base station information non-reception handover decision unit decides that the neighbor base station information non-reception handover is established; an identification information acquisition unit which acquires identification information for the neighbor base station from the connectable neighbor base stations; and, a handover processing unit which transmits to the serving base station a handover request including the acquired identification information, receives from the serving base station a handover response including service level information indicating information as to what extent of service flow can be taken over by the neighbor base stations from the connected base station, and decides the handover destination based on the service level information.

Furthermore, to achieve the object, another aspect of the present invention is a wireless communication system, having: a mobile station, and a plurality of base station, wherein, the mobile station has: a neighbor base station information non-reception handover decision unit which decides that neighbor base station information non-reception handover is established, if neighbor base station information relating to the neighbor base stations is not received from the serving base station and the radio wave strength of radio waves from the serving base station is lower than a threshold value; a scan processing unit which searches for the connectable neighbor base station based on frequencies stored in a table, if the neighbor base station information non-reception handover decision unit decides that the neighbor base station information non-reception handover is established; an identification information acquisition unit which acquires identification information for the neighbor base stations from the connectable neighbor base stations; and, a handover processing unit which transmits to the serving base station a handover request including the acquired identification information, receives from the serving base station a handover response including service level information indicating information as to what extent of service flow can be taken over by the neighbor base station from the serving base station, and decides the handover destination based on the service level information, and the serving base station has: a handover response transmission unit which transmits to the mobile station the handover response including the service level information.

Furthermore, to achieve the object, another aspect of the present invention is a processing method in a mobile station for executing a handover processing from a base station to another base station before the mobile station, which wirelessly connects to the base station notifying information relating to a neighbor base station intermittently, receives the information relating to the neighbor base station from the base station, the method having the steps of: receiving signals transmitted from the neighbor base station, and receiving identification information for the neighbor base station; transmitting the identification information to the connected base station; receiving from the connected base station the information relating to the neighbor base station corresponding to the identification information; and deciding a handover destination based on the information relating to the neighbor base station.

By each of the present invention, a handover method in a wireless communication system, mobile station, and wireless communication system, which shorten the handover time, can be provided.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Below, preferred embodiments of the present invention are explained.

Figure 1:
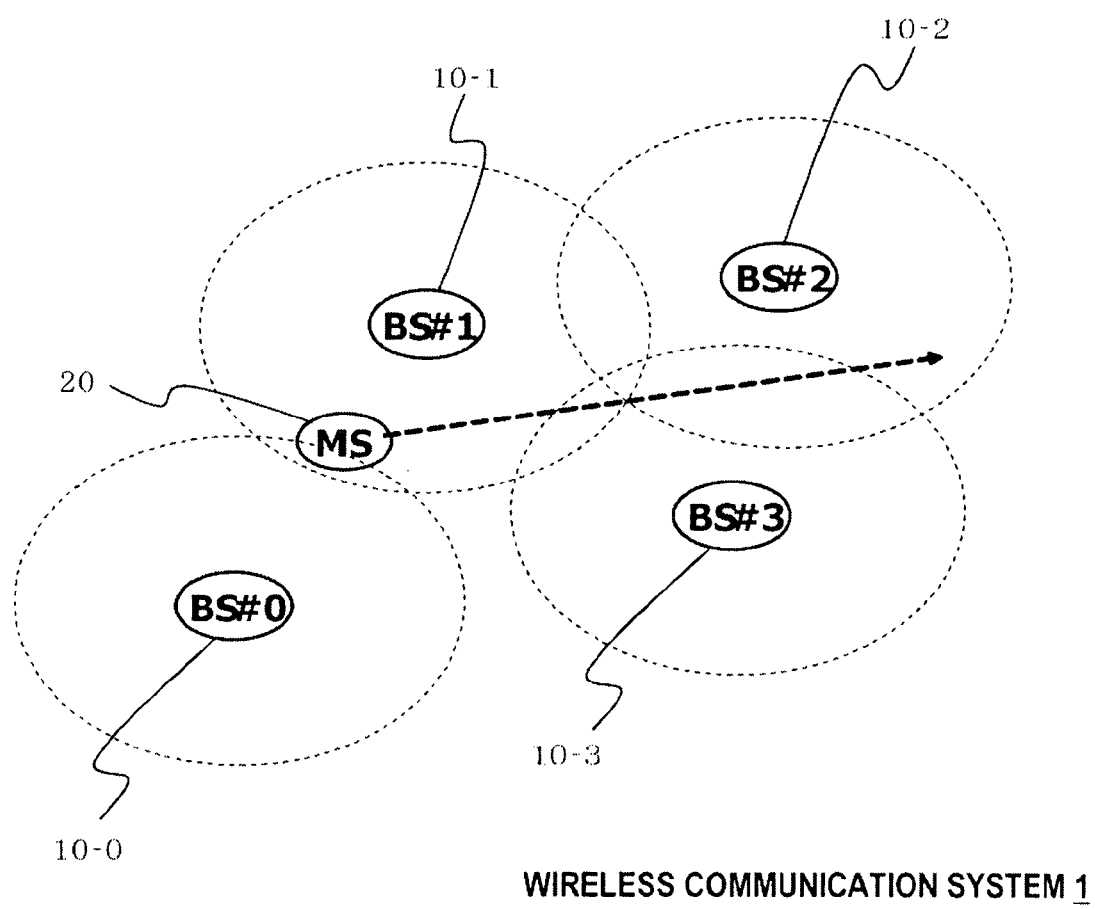
FIG. 1 shows an example of the configuration of a wireless communication system 1.

FIG. 1 shows an example of the configuration of a wireless communication system 1. The wireless communication system 1 has a plurality of base stations (BS#0 to BS#3) 10-0 to 10-3, and a mobile station (MS) 20. FIG. 1 shows an example in which the mobile station (MS) 20 connects from the 0th base station (BS#0) 10-0 to the 1st base station (BS#1) 10-1, and then, for example before 30 seconds have elapsed, moving into the cell range of the 2nd base station (BS#2) 10-2. The dashed lines indicate the cell ranges of each of the base stations (BS#0 to BS#3), 10-0 to 10-3. In this embodiment, communication based on the specifications of IEEE 802.16e is performed between the mobile station (MS) 20 and the base stations (BS#0 to BS#3) 10-0 to 10-3.

Figure 2:
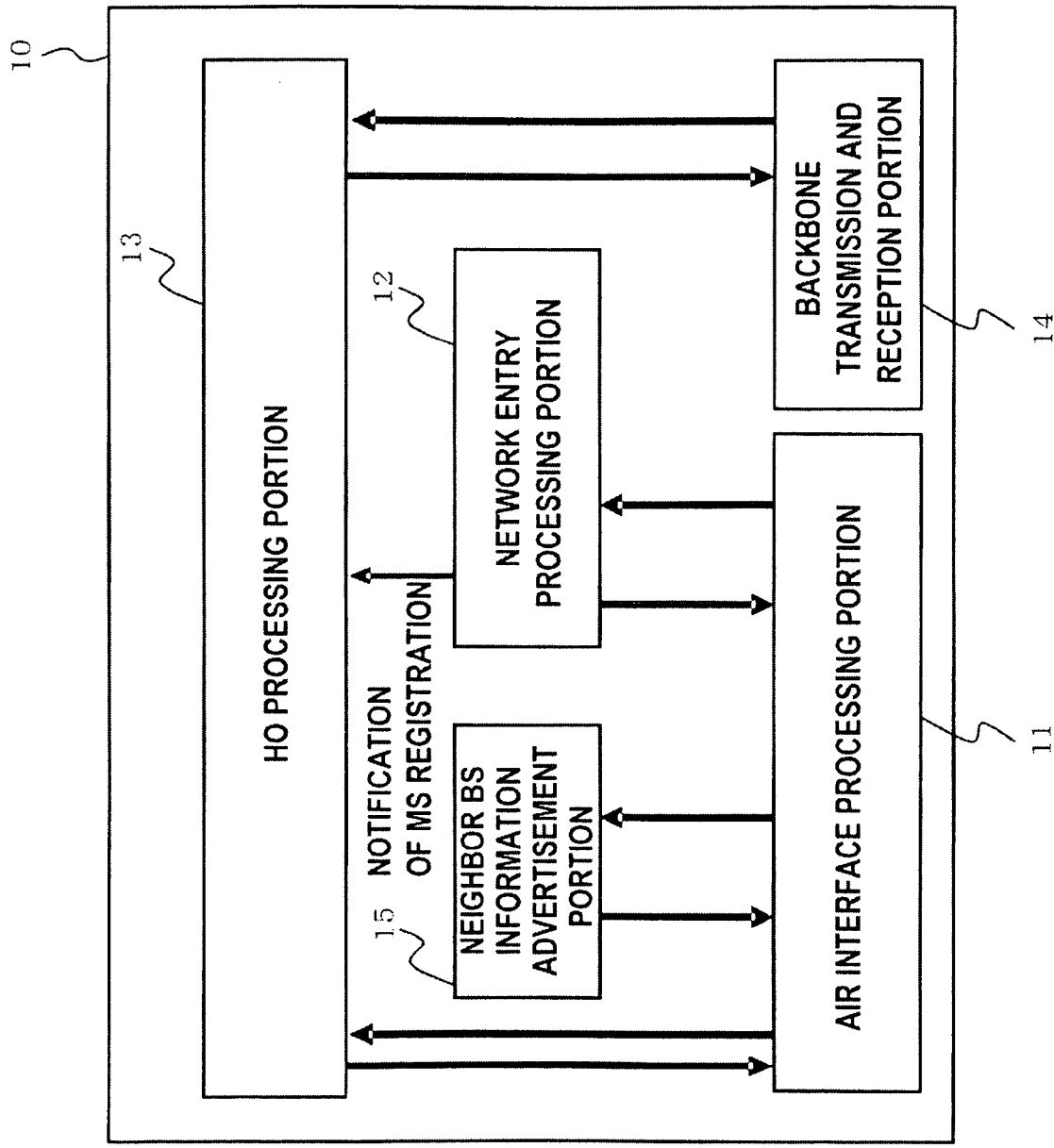
FIG. 2 shows an example of the configuration of a base station.
Figure 3:
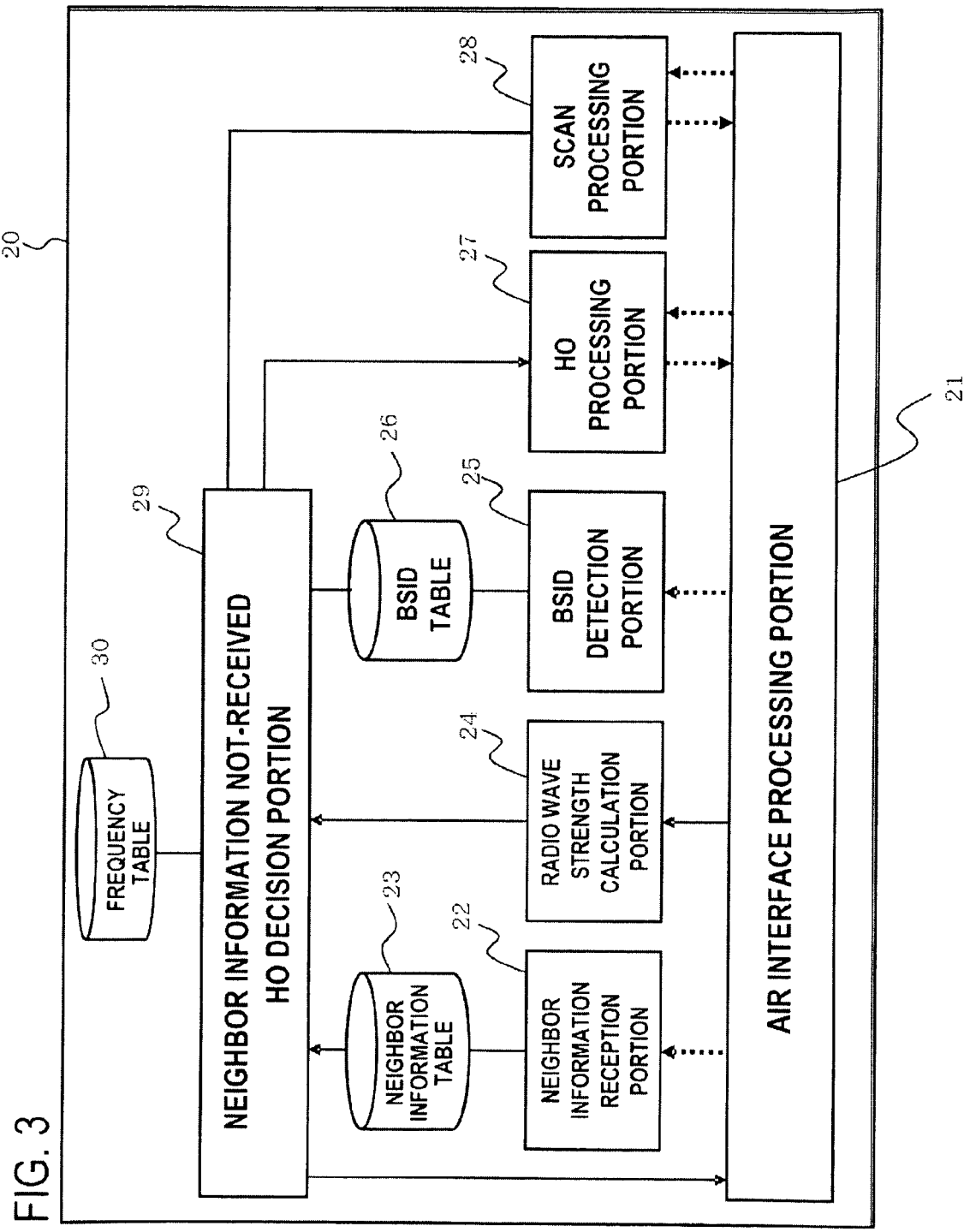
FIG. 3 shows an example of the configuration of a mobile station.

Next, examples of the configuration of the base station (BS) 10 and mobile station (MS) 20 are explained. FIG. 2 and FIG. 3 show examples of the configuration of the base station (BS) 10 and of the mobile station (MS) 20, respectively. Each of the base stations (BS#0 to BS#3) 10-0 to 10-3 in FIG. 1 has the same configuration as the base station (BS) 10 of FIG. 2.

As shown in FIG. 2, the base station (BS) 10 has an air interface transmission and reception processing portion 11, network entry processing portion 12, handover (HO) processing portion 13, backbone transmission and reception portion 14, and neighbor BS information advertisement portion 15.

The air interface transmission and reception portion 11 converts various messages output from the processing portions 12, 13 and 15 into radio waves, transmits to the mobile station (MS) 20, receives radio waves from the mobile station (MS) 20, and retrieves messages for output to the processing portions 12, 13 and 15.

The network entry processing portion 12 is a processing portion to perform processing of a registration procedure protocol to connect the mobile station (MS) 20 to the base station (BS) 10. The network entry processing portion 12 outputs control messages to the air interface transmission and reception processing portion 11, and receives control messages sent by the mobile station (MS) 20 from the air interface transmission and reception processing portion 11, in order to exchange control messages with the mobile station (MS) 20. The network entry processing portion 12 also periodically exchanges messages with the mobile station (MS) 20 in order to confirm the existence of the mobile station (MS) 20 even after completion of the registration procedure.

The handover processing portion 13 outputs control messages for handover, to be transmitted to the mobile station (MS) 20, to the air interface transmission and reception processing portion 11, and receives control messages for handover, transmitted from the mobile station (MS) 20, via the air interface transmission and reception processing portion 11, when handover with the mobile station (MS) 20 is started. Also, the handover processing portion 13 outputs information (hereafter called "context") relating to the mobile station (MS) 20 to the backbone transmission and reception portion 14 for transmission to the handover destination base station, when handover with the mobile station (MS) 20 is started. Furthermore, the handover processing portion 13 outputs to the backbone transmission and reception portion 14 a request message for context for the mobile station (MS) 20 for transmission to the serving base station (SBS), upon notification from the network entry processing portion 12 of new registration of the mobile station (MS) 20, if the base station (BS) 10 is the handover destination base station.

The backbone transmission and reception portion 14 transmits and receives messages with other base stations (BS) via the backbone network.

The neighbor BS information advertisement portion 15 transmits messages (hereafter "neighbor BS information"), including information (BSID and similar) relating to other base stations (BS) collected via the backbone transmission and reception portion 14, via the air interface transmission and reception processing portion 11.

As shown in FIG. 3, the mobile station (MS) 20 has an air interface transmission and reception processing portion 21, neighbor information reception portion 22, neighbor information table 23, radio wave strength calculation portion 24, BSID detection portion 25, BSID table 26, handover (HO) processing portion 27, scan processing portion 28, neighbor information non-reception handover (HO) decision portion 29, and frequency table 30.

The air interface processing portion 21 performs transmission and reception of frames in synchronization with frames from the connected base station (BS) 10, and measures the radio wave strength of received frames. Also, the air interface processing portion 21 converts control messages received from each of the processing portions 27 and 28 into radio waves for transmission to the base station (BS) 10, and outputs control messages received from the base station (BS) 10 to the different processing portions 22 and 25, and similar.

The neighbor information reception portion 22 receives neighbor BS information, periodically transmitted by the serving base station (SBS) 10, via the air interface processing portion 21, and stores the information in the neighbor information table 23.

The neighbor information table 23 is a table which stores neighbor BS information received from the serving base station (SBS) 10.

The radio wave strength calculation portion 24 calculates the average value from radio wave strengths for each frame measured by the air interface processing portion 21, and performs modification of radio wave strength and similar.

The BSID detection portion 25 receives DL-MAP from the base station (BS) 10, and detects the BSID contained in the DL-MAP. The BSID detection portion 25 outputs the detected BSID to the BSID table 26.

The BSID table 26 is a table storing BSID.

The handover processing portion 27 executes the HO-REQ/RSP sequence with the serving base station (SBS) 10 when handover has become necessary, and issues an instruction to the air interface processing portion 21 for switching to the handover destination base station (BS) 10.

The scan processing portion 28 exchanges scan messages (SCN-REQ/RSP messages and similar) with the serving base station (SBS) 10, and issues an instruction to the air interface processing portion 21 to switch to the scan destination base station.

The neighbor information non-reception HO decision portion 29 decides whether to perform handover without receiving neighbor BS information (hereafter called "neighbor information non-reception handover") based on neighbor BS information stored in the neighbor information table 23 and on the radio wave strength output from the radio wave strength measurement portion 24. For example, the neighbor information not-reception HO decision portion 29 decides to perform neighbor information non-reception handover, upon detecting that the neighbor information reception portion 22 has not received neighbor BS information (neighbor BS information is not stored in the neighbor information table 23), and moreover that the radio wave strength of the serving base station (SBS) 10 has reduced to a strength requiring handover. Further, the neighbor information non-reception handover decision portion 29 issues an instruction to the scan processing portion 28 to transmit a scan request when it is decided that neighbor information not-reception handover is necessary. Details are explained below.

The frequency table 30 is a table storing center frequencies of base stations (BS) 10. For example, the scan processing portion 28 reads center frequencies of the different base stations (BS) 10 from the frequency table 30, and scans in sequence, when the scan processing portion 28 executes neighbor information non-reception handover.

Figure 8:
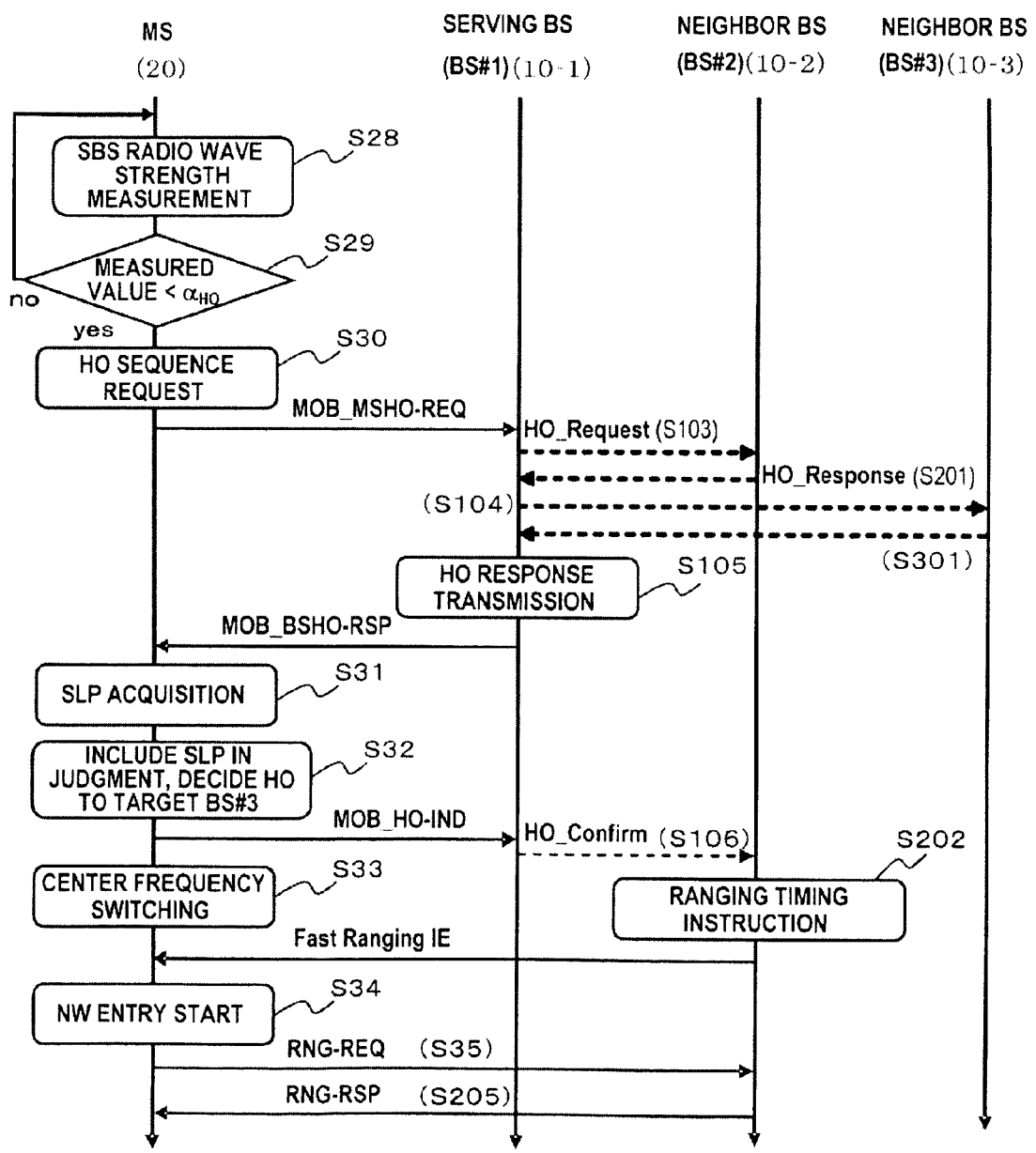
FIG. 8 is a sequence example of a handover phase.
Figure 9:
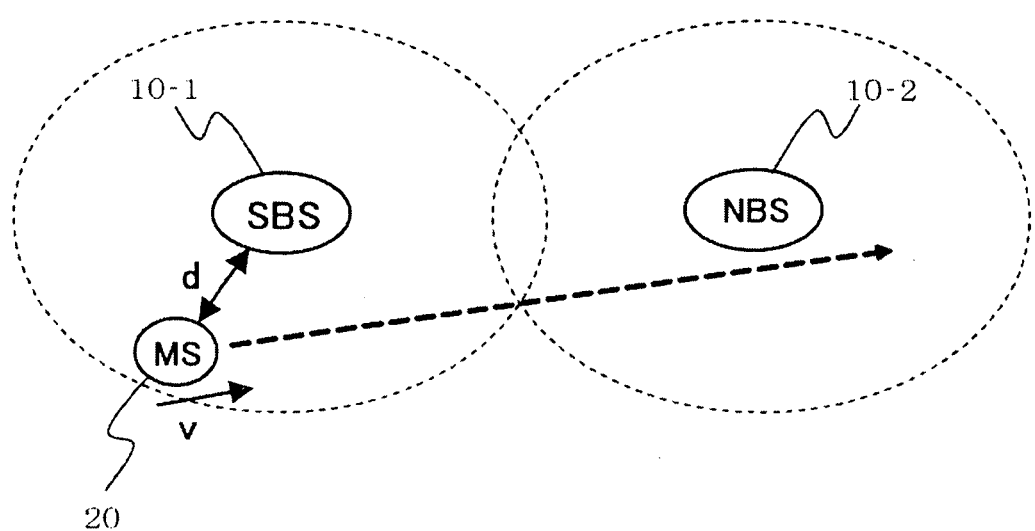
FIG. 9 is an outline for showing a relation between moving speed and size of a cell.

Next, operation of the wireless communication system 1 is explained. In this operation, a neighbor information non-reception handover detection phase shown in FIG. 4, a BSID detection phase shown in FIG. 5, and a handover phase shown in FIG. 8 are executed in order.

The operation described below, as shown in FIG. 1, is explained for an example of a case in which handover of mobile station (MS) 20 from the 0th base station (BS#0) 10-0 to the first base station (BS#1) 10-1 is performed, the mobile station (MS) 20 leaves the cell of the first base station (BS#1) 10-1 at high speed (for example, in 30 second), and handover to the second base station (BS#2) 10-2 is performed.

Figure 4:
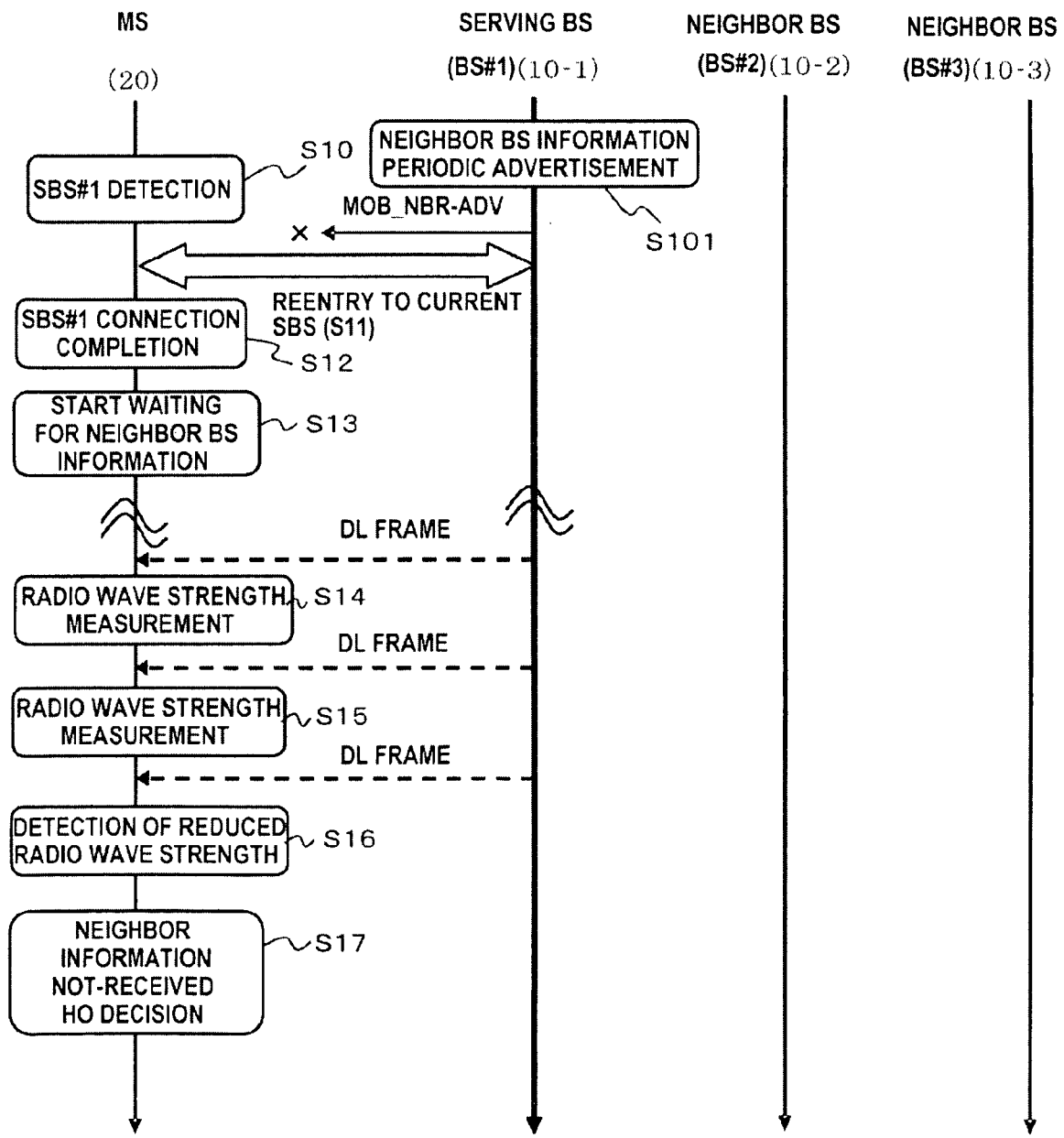
FIG. 4 is a sequence example of a neighbor information non-reception handover detection phase.
Figure 5:
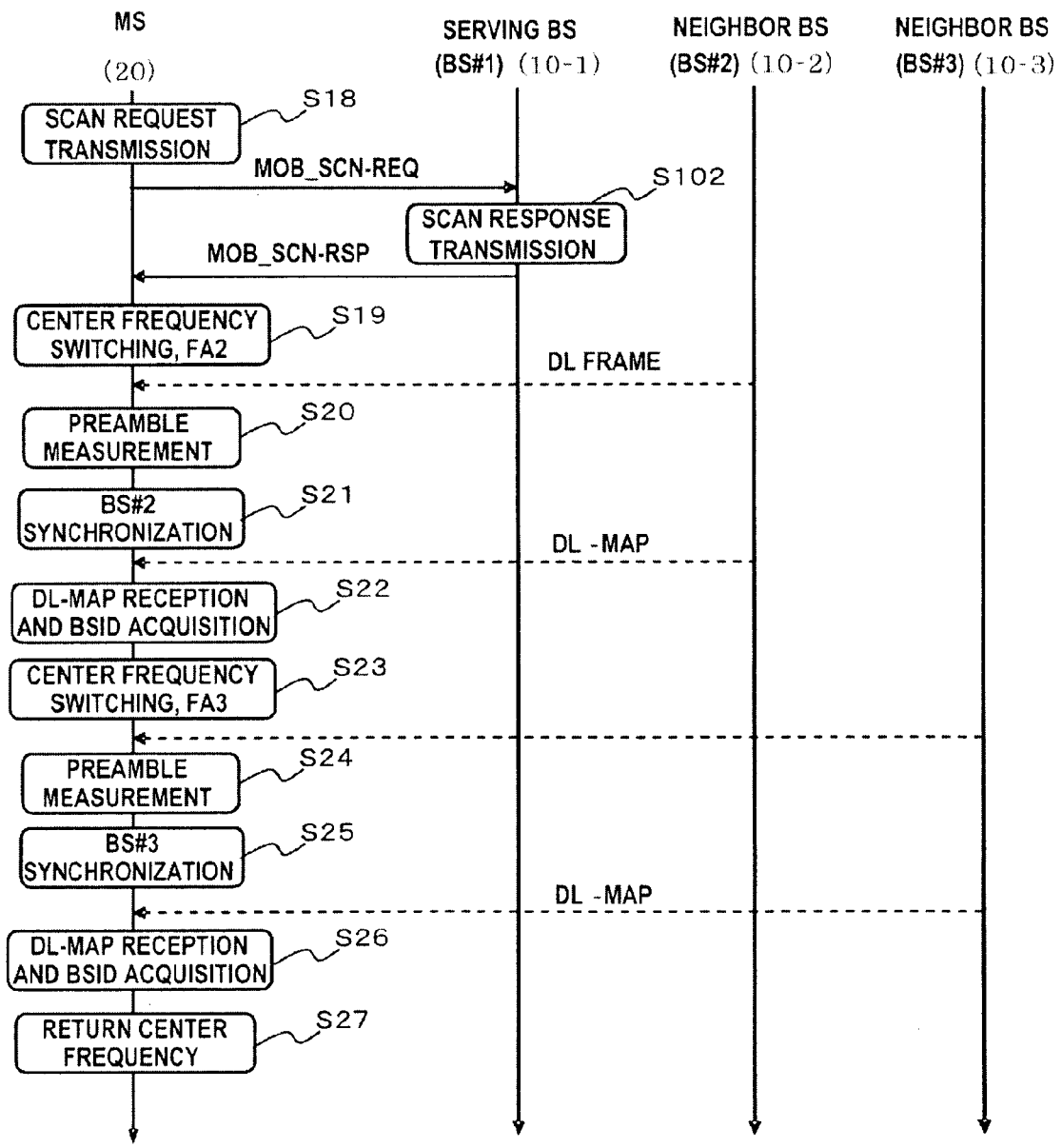
FIG. 5 is a sequence example of a BSID detection phase.

As shown in FIG. 4, in the neighbor information non-reception handover detection phase, the first base station (BS#1) 10-1 periodically broadcasts neighbor BS information (S101). The neighbor BS information advertisement portion 15 generates a MOB_NBR-ADV message as neighbor BS information, and periodically (for example, every 30 seconds) transmits this message via the air interface processing portion 11. In this stage, the mobile station (MS) 20 is not connected to the first base station (BS#1) 10-1, and does not receive the neighbor BS information.

The mobile station (MS) 20 executes the network entry procedure (S11), when the mobile station (MS) 20 detects the reduction of the radio wave strength of the 0th base station (BS#0) 10-0 and find radio waves of the first base station (BS#1) 10-1 (S10). For example, the network entry procedure is executed between the network entry processing portion 12 of the first base station (BS#1) 10-1 and the handover processing portion 27 of the mobile station (MS) 20, via the respective air interface processing portions 11 and 21.

The mobile station (MS) 20 completes connection with the first base station (BS#1) 10-1 (S12), upon completion of the network entry procedure.

Next, the mobile station (MS) 20 begins waiting for neighbor BS information (S13).

Also, the mobile station (MS) 20 constantly measures the radio wave strength of radio waves received from the first base station (BS#1) 10-1, which is the serving base station (SBS) (S14 and S15).

Thereafter, as a result of movement, the mobile station (MS) 20 detects a reduction of the strength of radio waves from the first base station (BS#1) 10-1 (S16). And, the mobile station (MS) 20 decides whether or not to execute neighbor information non-reception handover (S17), by confirming reception of neighbor BS information, when the mobile station (MS) 20 detects that the reduction of radio wave strength has fallen below a certain threshold value.

This decision is performed as follows. The air interface processing portion 21 measures the radio wave strength, the radio wave strength calculation portion 24 calculates the radio wave strength, and the air interface processing portion 21 and radio wave strength calculation portion 24 output the result to the neighbor information non-reception handover decision portion 29. The neighbor information non-reception handover decision portion 29 detects whether the radio wave strength has fallen below the threshold value, and when below the threshold value, accesses the neighbor information table 23 and checks whether neighbor BS information is stored. And, upon detecting that neighbor BS information is not stored in the neighbor information table 23, the neighbor information non-reception handover decision portion 29 decided that neighbor information non-reception handover is necessary.

The mobile station (MS) 20 shifts to the BSID detection phase (FIG. 3), when the mobile station (MS) 20 decides that neighbor information non-reception handover is necessary.

In the BSID detection phase, the mobile station (MS) 20 transmits a scan request (MON_SCN-REQ message) to the first base station (BS#1) 10-1 (S18).

This is in order to cause temporary interruption of transmission of user data from the first base station (BS#1) 10-1 to the mobile station (MS) 20, and to secure time for the mobile station (MS) 20 to measure the radio wave strength of other base stations (BS#2 and similar). The scan request is generated by the scan processing portion 28, and is transmitted via the air interface processing portion 21. The neighbor information non-reception handover decision portion 29 instructs the scan processing portion 28 to transmit a scan request, upon deciding that neighbor information non-reception handover is necessary, and as a result the scan processing portion 28 generates and transmits the scan request. This scan request includes an interruption time.

The first base station (BS#1) 10-1 transmits a scan response (MOB_SCN-RSP) to the mobile station (MS) 20 (S102), upon receiving the scan request. The scan response is transmitted, for example, from the handover processing portion 13 via the air interface processing portion 11.

The mobile station (MS) 20 references the frequency table 30, and switches in order to center frequencies stored in advance (S19 and S23), upon receiving the scan response.

Figure 6:
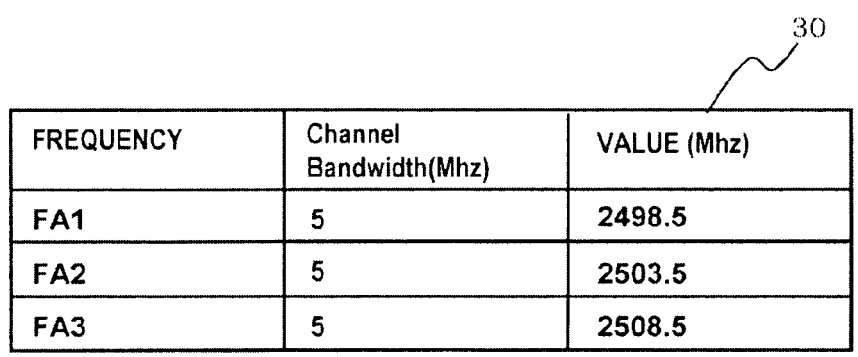
FIG. 6 shows an example of a frequency table.

FIG. 6 shows an example of the frequency table 30. The frequency table 30 has the center frequency, bandwidth, and actual center frequency value. For example, in the row with center frequency of "FA1", the bandwidth is "5" (MHz), and the actual center frequency is "2498.5" (MHz). In this embodiment, the center frequency "FA1" is the center frequency of the first base station (BS#1) 10-1, "FA2" is the center frequency of the second base station (BS#2) 10-2, and "FA3" is the center frequency of the third base station (BS#3) 10-3.

For example, the scan processing portion 28 receives the scan response, outputs this information to the neighbor information non-reception handover decision portion 29, and the neighbor information non-reception handover decision portion 29 reads, in succession, center frequencies from the frequency table 30 ("2498.5 MHz" and similar; below, to facilitate explanation, the column with "FA2" and similar is used to refer to the actual center frequency). And, the neighbor information non-reception handover decision portion 29 instructs the air interface processing portion 21, via the scan processing portion 28, to perform frequency switching, and the air interface processing portion 21 switches the frequency. Thereafter, switching to "FA2" and "FA3" is performed in order.

The mobile station (MS) 20 switches the center frequency to "FA2" (S19), and measures the radio wave strength of the frame preamble portion. The mobile station (MS) 20 detects neighbor base stations at center frequency "FA2" with a radio wave strength equal to or greater than a fixed value, to search for neighbor base stations capable of connection. For example, radio wave strength measurement and calculation are performed by the air interface processing portion 21 and the radio wave strength calculation portion 24, respectively, and the neighbor information non-reception handover decision portion 29 searches for neighbor base stations capable of connection.

As a result of measuring the radio wave strength for the center frequency "FA2", the mobile station (MS) 20 judges the second base station (BS#2) 10-2 to be a neighbor base station capable of connection (S20).

At this time, the mobile station (MS) 20 receives DL-MAP (frame control information, and information indicating various message arrangement information in the downlink direction within the frame) in synchronization with the second base station (BS#2) 10-2 (S21), and acquires the BSID of the second base station (BS#2) 10-2 from DL-MAP (S22). The BSID detection portion 25 acquires the BSID from DL-MAP, and stores the BSID in the BSID table 26. The mobile station (MS) 20 peeks the frame from the second base station (BS#2) 10-2, and acquires the BSID of this base station 10-2.

Thereafter, the mobile station (MS) 20 switches the center frequency to "FA3" (S23), measures the radio wave strength of the preamble portion, and detects neighbor base stations for which the radio wave strength at center frequency "FA3" is equal to or greater than the fixed value. The mobile station (MS) 20 detects the radio wave strength of the third base station (BS#3) 10-3 at center frequency "FA3" (S24).

The mobile station (MS) 20 receives a frame from the third base station (BS#3) 10-3, in synchronization with the third base station (BS#3) 10-3 (S25). The mobile station (MS) 20 then acquires the BSID of the third base station (BS#3) 10-3 from the DL-MAP included by the frame (S26). The BSID detection portion 25 stores acquired BSID in the BSID table 26. The mobile station (MS) 20 peeks the frame from the third base station (BS#3) 10-3, and acquires the BSID of the base station 10-3.

Then, when the mobile station (MS) 20 ends the searching of the center frequencies stored in the frequency table 30, the mobile station (MS) 20 returns the center frequency to the original serving base station (BS#1) 10-1, and resumes connection (S27). For example, the neighbor information non-reception handover decision portion 29 issues an instruction to the scan processing portion 28 to switch to the original serving base station (BS#1) 10-1 when searching of all frequencies stored in the frequency table 30 ends, and the air interface processing portion 21 switches the frequency to the serving base station (BS#1) 10-1 based on an instruction from the scan processing portion 28.

Figure 7:
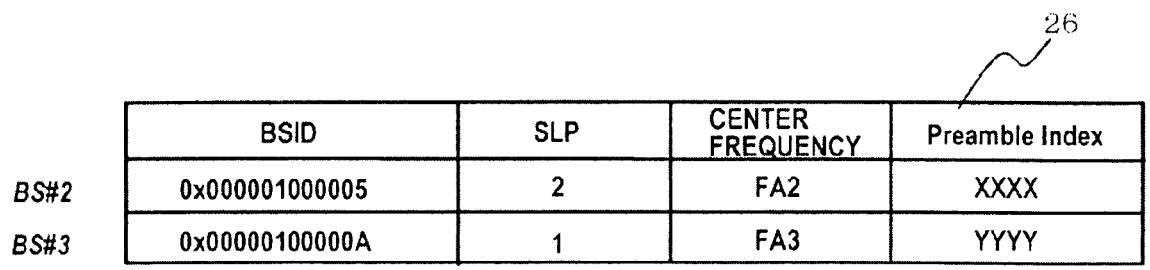
FIG. 7 shows an example of a BSID table.

FIG. 7 shows an example of the BSID table 26. The BSID table 26 has columns for BSID, service level information (SLP: Service Level Prediction), center frequencies, and a preamble index. The BSID stored in the BSID table 26 are identification information for handover candidate base stations. The SLP is information necessary when deciding on a handover destination, and the center frequency and preamble index are information necessary when actually performing handover after the handover destination has been decided.

Service level information is stored in the BSID table 26 during the handover phase (S31 in FIG. 8), described below. The preamble index indicates different identification information for each base station 10, and is acquired during preamble measurement (S19 and S24) or from a frame or frame preamble at the time of DL-MAP reception (S22 and S26).

Next, the mobile station (MS) 20 makes a shift to the handover phase (see FIG. 8).

Upon transition to the handover phase, the mobile station (MS) 20 measures the radio wave strength of the serving base station (BS#1) 10-1, and decides whether the handover trigger condition is satisfied (S28 and S29). The handover trigger condition is for example the condition that the radio wave strength of the serving base station (BS#1) 10-1 has reduced such that the measured value is smaller than a threshold value $\alpha_{HO}$. The air interface processing portion 21 measures the radio wave strength, and for example the neighbor information non-reception handover decision portion 29 decides whether the trigger condition has been met. The neighbor information non-reception handover decision portion 29 repeats this processing until the trigger condition is met (the S29 "no" loop).

Then, when the handover trigger condition is satisfied ("Yes" in S29), the mobile station (MS) 20 transmits a handover request (MOB_MSHO-REQ message) to the serving base station (BS#1) 10-1 (S30). At this time, the handover processing portion 27 reads the BSID stored in the BSID table 26 and transmits the handover request including BSID.

For example, upon deciding that the trigger condition is satisfied, the neighbor information non-reception handover decision portion 29 instructs the handover processing portion 27 to generate and transmit a handover request, and the handover processing portion 27 transmits the request based on the instruction.

The first base station (BS#1) 10-1, which is the serving base station, transmits a handover request (HO_Request) to the second and third base stations (BS#2 and BS#3) 10-2 and 10-3, via the backbone network, based on the BSID contained in the handover request (S103 and S104), upon receiving the handover request.

This request also includes context held by the base station itself. For example, such information as the SFID (service flow ID) acquired at the time of the network entry procedure (S11), the QoS (Quality of Service), and similar is included in the handover request.

The second and third base stations (BS#2 and BS#3) 10-2 and 10-3 transmit to the serving base station (BS#1) 10-1, via the backbone network, a response (HO_Response) to the handover request (S201 and S301), upon receiving the handover request. This response includes service level information (SLP), indicating the service flow which can be handed over to each of the base stations (BS#2 and BS#3) 10-2 and 10-3.

The first base station (BS#1) 10-1 transmits a handover response (MOB_BSHO-RSP message) to the mobile station (MS) 20 (S105), upon receiving the responses from the neighbor base stations (BS#2 and BS#3) 10-2 and 10-3. This response includes service level information received from each of the neighbor base stations (BS#2 and BS#3) 10-2 and 10-3. The handover processing portion 13 holds service level information received via the backbone transmission and reception portion 14, and in this processing, generates and transmits the handover response such that the service level information is included.

The mobile station (MS) 20 receives the handover response and acquires service level information (S31). For example, the information is acquired by the handover processing portion 27, and is stored in the BSID table 26 via the air interface processing portion 21 and BSID detection portion 25. Service level information is stored in the "SLP" column of the BSID table 26 shown in FIG. 7.

Next, the mobile station (MS) 20 references the BSID table 26, hands over the greatest amount of service flow set with the current serving base station (BS#1) 10-1, and moreover determines the neighbor base station with the strongest radio wave strength to be the handover destination (S32). This processing is the same as the above-described controlled HO processing.

For example, the handover processing portion 27 of the mobile station (MS) 20 references the BSID table 26, and from among the base stations which are handover destinations, decides on the base station with the highest SLP value (in the example of FIG. 7, the second base station (BS#2) 10-2) as the handover destination The mobile station (MS) 20 transmits to the serving base station (BS#1) 10-1 a message (MOB_HO-IND) including the BSID of the handover destination (S32).

The serving base station (BS#1) 10-1 notifies the second base station (BS#2) 10-2, via the backbone network, that it is the handover destination (S106).

Next, the mobile station (MS) 20 switches the center frequency to that of the second base station (BS#2) 10-2 (S33). Also, the second base station (BS#2) 10-2 requests ranging of the mobile station (MS) 20 (S202), with ranging timing specified in advance in a MOB-BSHO-RSP message by the serving base station (BS#1) 10-1, and for that, transmits DL-MAP including a Fast Ranging IE to the mobile station (MS) 20.

Thereafter, the mobile station (MS) 20 begins network entry with the second base station (BS#2) 10-2 (S34), and ranging messages (RNG-REQ and RNG-RSP) and other messages are sent and received. And, the mobile station (MS) 20 can then transmit and receive user data with the second base station (BS#2) 10-2, and communication is resumed.

In this way, in this embodiment the mobile station (MS) 20 detects reduction of the radio wave strength from the serving base station (BS#1) 10-1, and even when neighbor BS information cannot be received (when MOB_NBR-ADV cannot be received), switches the center frequency to acquire (peek) BSID from neighbor base stations (BS#2 and BS#3) 10-2 and 10-3, and thereafter executes the handover sequence (the processing from S30 to S32 and similar) with the serving base station (BS#1) 10-1. Because the mobile station (MS) 20 can acquire service level information through execution of the normal handover sequence, the mobile station (MS) 20 selects the optimum base station (BS#2 and BS#3) 10-2 and 10-3 for handover of service flow from among the handover candidate base stations (BS#2 and BS#3) 10-2 and 10-3.

Figure 13:
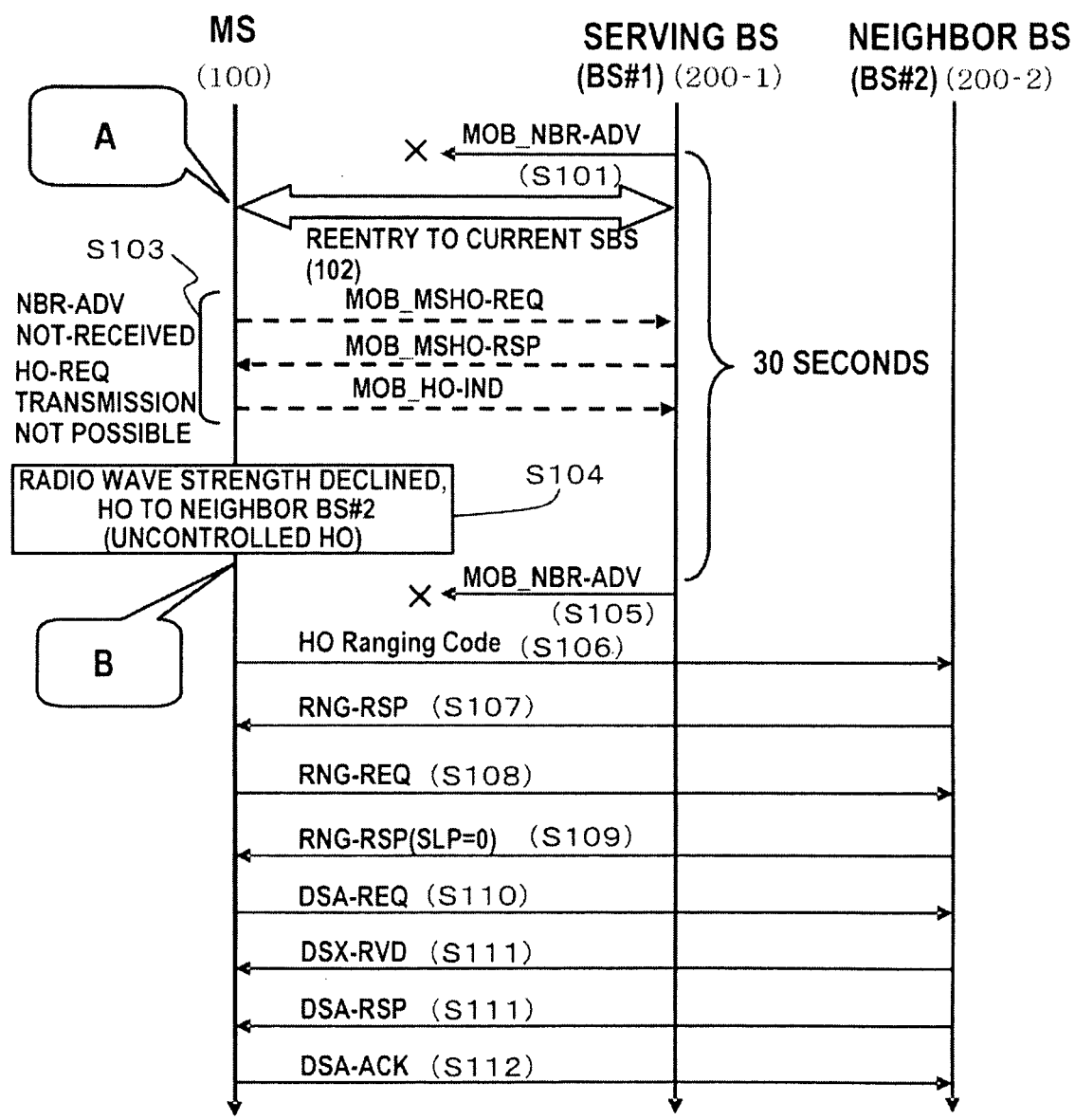
FIG. 13 shows a sequence example where the base station broadcasts neighbor information.

After the center frequency has been switched (S33), the processing of S205 ends, and during the period in which user data can be sent and received, there is no service flow re-registration processing (S110 to S112 in FIG. 13), so that to this extent, the handover time can be shortened in this embodiment. Also, in this embodiment, for similar reasons, the control message volume during handover process can be reduced, and air band utilization can be decreased.

In the above-described example, the decision criteria of executing neighbor information non-reception handover is in case of that the mobile station (MS) 20 is not receiving neighbor BS information, and moreover detects a reduction of radio wave strength from the serving base station (BS#1) 10-1. In addition, neighbor information non-reception handover may be executed, in case that it is anticipated that the mobile station (MS) 20 will leave the cell range of the serving base station, based on the size d of the cell of the serving station (BS#1) 10-1 and on the movement velocity v from the radio wave strength. Details are explained below.

In general, if the power (W) received by the mobile station (MS) 20 is $P_r$, then the following relation obtains.

$$P_r = A_{er}\left(\frac{G_t P_t}{4\pi d^2}\right)$$

Here $A_{er}$ is the effective area of the receiving antenna of the mobile station (MS) 20 (a value inherent to the mobile station (MS) 20), $G_t$ is the transmitting antenna gain of the mobile station (MS) 20, $P_t$ (W) is the power supplied to the transmitting antenna, and d (m) is the distance from the base station (SBS) 10-1 to the mobile station (MS) 20.

Furthermore, the EIRP (Effective Isotropic Radiated Power) is included in the DCD message received from the serving base station (SBS) 10-1 during network entry processing (S11), and in general is as follows.

$$EIRP = P_t G_t$$

Substituting equation (2) into equation (1), the distance d from the antenna of the base station (SBS) 10-1 is as follows.

$$d = \sqrt{\frac{A_{er} EIRP}{4\pi P_r}}$$

Here, as the value of the received power $P_r$, the power value at which signals and noise can no longer be discriminated at the cell boundaries, $10^{-10}$ mW (approximately −100 dBm) is inserted. At this time, $A_{er}$ is an inherent value, and EIRP is the value for reception from the serving base station (SBS) 10-1, so that the mobile station (MS) 20 can estimate the radius of the cell boundaries from equation (3).

On the other hand, the current movement velocity v can be determined from a velocity meter of a vehicle in which the mobile station (MS) 20 is mounted, or similar. Also, a Broadcast Control Pointer IE is included in the DL-MAP received from the serving base station (SBS) 10-1 (S11 and similar), and the transmission time of the next neighbor BS information (MOB_NBR-ADV) is included in the Broadcast Control Pointer IE.

The mobile station (MS) 20 estimates the cell size from EIRP for different base stations, based on equation (3), detects the movement velocity from the velocity meter or similar, and determines the time to the next neighbor BS information transmission from the neighbor BS information transmission time included in the DL-MAP.

Then, for example the mobile station (MS) 20 anticipates going out the cell range, and executes the neighbor information non-reception handover, when the mobile station (MS) 20 multiplies the movement velocity by the time until the next neighbor BS information is transmitted, calculates the position of the mobile station (MS) 20 in case of receiving the next neighbor BS information, and the position exceeds the estimated size of the cell.

The mobile station (MS) 20 may execute neighbor information non-reception handover when the mobile station (MS) 20 detects departure from the cell range of the serving base station (SBS) 10-1, without reception of neighbor BS information from the serving base station (SBS) 10-1. In the other example described above, judgment is based on the cell size d, movement velocity v, and transmission time of neighbor BS information.

For example, the neighbor information reception portion 22 extracts the advertisement time of the next neighbor BS information from DL-MAP, and stores the time in the neighbor information table 23. The radio wave strength calculation portion 24 calculates (estimates) the size d of the cell from the received EIRP value in the DCD message at the time of network entry. Further, the neighbor information non-reception handover decision portion 29 detects the velocity of the mobile station (MS) 20. And, the neighbor information non-reception handover decision portion 29 performs the above decision based on the advertisement time read from the neighbor information table 23, the cell size d from the radio wave strength calculation portion 24, and the detected movement velocity.

Figure 10:
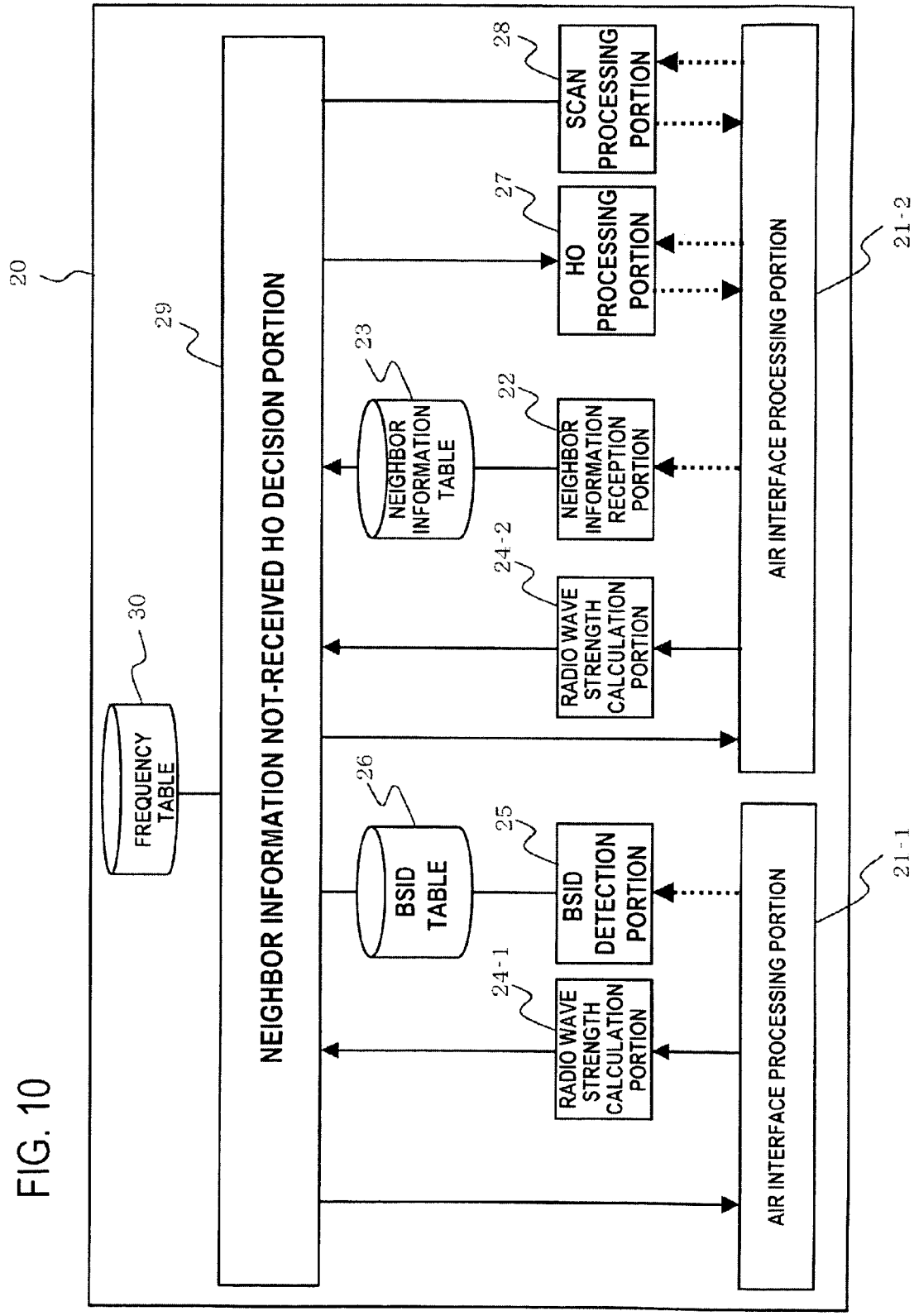
FIG. 10 shows the other example of a configuration of the mobile station.
Figures 11, 12:
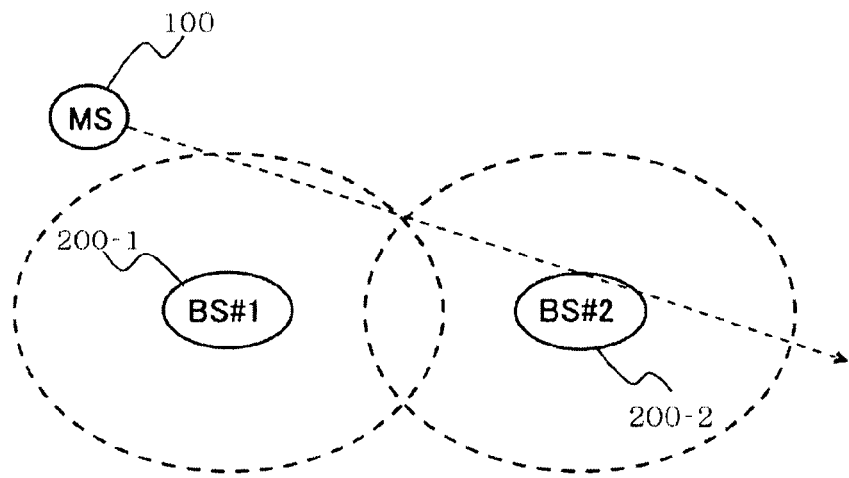
FIG. 11 is an example where a mobile station has left a cell at high speed.
FIG. 12 shows an example of service level prediction (SLP) information.

In the above-described example, the mobile station (MS) 20 transmits the scan request (MOB_SCN-REQ), so that transmission of frames with the serving base station (BS#1) 10-1 is temporarily interrupted (S18 and S102). For example, the mobile station (MS) 20 may have two air interface processing portions; one continues communication with the serving base station (BS#1) 10-1, and the other switches the center frequency so as to acquire the BSID of neighbor base stations (BS#2 and BS#3) 10-2 and 10-3. FIG. 10 shows an example of the configuration of the mobile station (MS) 20 in such a case. The first air interface processing portion 21-1 switches the center frequency and receives DL-MAP from neighbor base stations (BS#2 and BS#3) 10-2 and 10-3, and the BSID detection portion 25 acquires (looks at) the BSID. The second air interface processing portion 21-2 continues communication at the center frequency of the serving base station (BS#1) 10-1. The mobile station (MS) 20 can acquire each of the BSID from other base stations (BS#2 and BS#3) 10-2 and 10-3 while continuing communication with the serving base station (BS#1) 10-1.

Further, in the above-described example, the scan request (MOB_SCN-REQ) is transmitted in order to temporarily interrupt frame transmission and reception. In addition, for example, the mobile station (MS) 20 may transmit a sleep request. Upon receiving this sleep request, the serving base station (BS#1) 10-1 detects that the mobile station (MS) 20 has entered into sleep mode, and temporarily halts transmission of frames.

Considering the embodiment explained above from one aspect, a processing method of the mobile station (MS) 20 in the case of executing the handover processing from the base station (BS#1) 10-1 to another base station, before the mobile station (MS) 20, which is wirelessly connected to the base station (serving BS#1) 10-1 which intermittently provides notification of information relating to neighbor base stations (BS#2 and BS#3) 10-2 and 10-3, receives information relating to the neighbor base stations from the base station (BS#1) 10-1, having: receiving signal transmitted from the neighbor base station (BS#2 and BS#3), receiving identification information (BSID) for neighbor base station (BS#2 and BS#3) 10-2 and 10-3, transmitting the identification information to the connected base station (BS#1) 10-1, receiving information relating to the neighbor base stations (BS#2 and BS#3) 10-2 and 10-3 corresponding to the identification information from the connected base station (BS#1) 10-1, and deciding on the handover destination based on the information relating to the neighbor base stations (BS#2 and BS#3) 10-2 and 10-3.

By this processing method, even before the mobile station (MS) 20 receives intermittently transmitted information relating the neighbor base stations (BS#2 and BS*3) 10-2 and 10-3 (for example, information as to whether service can be provided by the neighbor base station), the mobile station (MS) 20 receives identification information for the neighbor base stations (BS#2 and BS#3) 10-2 and 10-3, acquires information for the neighbor base stations (BS#2 and BS#3) 10-2 and 10-3 from the connected base station (BS#1) 10-1, and can use this information to decide the handover destination. It is preferable that the neighbor base stations (BS#2 and BS#3) 10-2 and 10-3 transmit comparatively frequently, such as for example transmitting identification information for the neighbor base stations in every frame. On the other hand, the neighbor base stations (BS#2 and BS#3) 10-2 and 10-3 may transmit information relating to the neighbor base stations (for example, service information indicating the contents of service provided by the neighbor base stations) less frequently compared with identification information.

In other words, it is conceivable for the mobile station (MS) 20, after acquiring the identification information, to directly acquire the information relating to the neighbor base stations (BS#2 and BS#3) 10-2 and 10-3 from the neighbor base stations. However, acquisition of the information relating to neighbor base stations (BS#2 and BS#3) 10-2 and 10-3 from the serving base station (BS#1) 10-1, as in this embodiment, results in faster processing and shorter handover times, compared with cases in which the information is acquired directly from the neighbor base stations (BS#2 and BS#3) 10-2 and 10-3. The reason for this is that the mobile station (MS) 20 is closer to the serving base station (BS#1) 10-1 than to the neighbor base stations (BS#2 and BS#3) 10-2 and 10-3, so that time is not required to acquire information relating to the neighbor base stations. Also, it is sufficient that the mobile station (MS) 20 be connected to the serving base station (BS#1) 10-1, and there is no need to switch the center frequency for each of the neighbor base stations (BS#2 and BS#3) 10-2 and 10-3 and connect.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A handover method in a wireless communication system performing handover of a mobile station from a connected base station to a neighbor base station, the method comprising:

deciding, in the mobile station, to perform neighbor base station information non-reception handover if the mobile station has not received neighbor base station information relating to neighbor base stations from the connected base station and if a radio wave strength of radio waves from the connected base station is below a threshold value;

searching for a connectable neighbor base station based on frequencies stored in a table in the mobile station if a decision is made that the neighbor base station information non-reception handover is to be performed;

acquiring, in the mobile station, identification information for a neighbor base station from the connectable neighbor base station search;

transmitting, by the mobile station, a handover request including the acquired identification information to the connected base station;

transmitting, by the connected base station that received the handover request, to the mobile station, service level information included with a handover response, the service level information indicating information as to what extent a service flow can be handed over from the connected base station to the neighbor base station; and acquiring, in the mobile station, the service level information from the handover response, and deciding a handover destination based on the service level information, wherein the decision to perform the neighbor base station information non-reception handover is established if a calculation is made that the mobile station moves out of the cell of the connected base station without receiving the neighbor base station information based on:

a size of the cell estimated from the strength of radio wave from the connected base station, a movement velocity of the mobile station, and a transmission interval of the neighbor base station information.

2. The handover method according to claim 1, further comprising:

transmitting, by the mobile station to the connected base station, an interruption request requesting a temporarily interruption of transmission of frames to the mobile station, wherein the acquiring the identification information from the connectable neighbor base station is executed when transmission of the frames by the serving base station is interrupted due to the interruption request.

3. The handover method according to claim 1, wherein the acquiring the identification information is executed by the mobile station while transmitting and receiving a frame to and from the connected base station if the decision is made that the neighbor base station information non-reception handover is established.

4. The handover method according to claim 2, wherein the interruption request is a scan request or a sleep request.

5. The handover method according to claim 1, wherein the acquiring further acquires the identification information in receiving frame configuration information from the connectable neighbor base station and in extracting the identification information for the connectable neighbor base station included in the frame configuration information.

6. The handover method according to claim 1, wherein the deciding further decides as a handover destination base station the neighbor base station which can take over the greatest amount of service flow with the connected base station using the service level information and the radio waves of which are strongest.

7. A mobile station for performing handover from a serving base station to a neighbor base station, comprising:
   a neighbor base station information non-reception handover decision unit which decides to perform a neighbor base station information non-reception handover if neighbor base station information relating to neighbor base stations is not received from the serving base station and if a radio wave strength of radio waves from the serving base station is lower than a threshold value;
   a scan processing unit which searches for a connectable neighbor base station based on frequencies stored in a table if the neighbor base station information non-reception handover decision unit decides to perform the neighbor base station information non-reception handover;
   an identification information acquisition unit which acquires identification information of a neighbor base station from the connectable neighbor base station search; and,
   a handover processing unit which transmits to the serving base station a handover request including the acquired identification information, receives from the serving base station a handover response including service level information indicating information as to what extent a service flow can be taken over by the neighbor base station from the connected base station, and decides the handover destination based on the service level information,
   wherein the decision to perform the neighbor base station information non-reception handover is established if a calculation is made that the mobile station moves out of the cell of the connected base station without receiving the neighbor base station information based on:
     a size of the cell estimated from the strength of radio wave from the connected base station,
     a movement velocity of the mobile station, and
     a transmission interval of the neighbor base station information.

8. A wireless communication system comprising:
   a mobile station, and
   a plurality of base stations, wherein,
   the mobile station comprises:
     a neighbor base station information non-reception handover decision unit which decides to perform neighbor base station information non-reception handover if neighbor base station information relating to neighbor base stations is not received from a serving base station and if a radio wave strength of radio waves from the serving base station is lower than a threshold value;
     a scan processing unit which searches for a connectable neighbor base station based on frequencies stored in a table if the neighbor base station information non-reception handover decision unit decides to perform the neighbor base station information non-reception handover;
     an identification information acquisition unit which acquires identification information for a neighbor base station from the connectable neighbor base station search; and,
     a handover processing unit which transmits to the serving base station a handover request including the acquired identification information, receives from the serving base station a handover response including service level information indicating information as to what extent a service flow can be taken over by the neighbor base station from the serving base station, and decides the handover destination based on the service level information,
   and the serving base station comprises:
     a handover response transmission unit which transmits to the mobile station the handover response including the service level information,
   wherein the decision to perform the neighbor base station information non-reception handover is established if a calculation is made that the mobile station moves out of the cell of the connected base station without receiving the neighbor base station information based on:
     a size of the cell estimated from the strength of radio wave from the connected base station,
     a movement velocity of the mobile station, and
     a transmission interval of the neighbor base station information.

* * * * *